United States Patent [19]

Kakinuma

[11] Patent Number: 4,733,846
[45] Date of Patent: Mar. 29, 1988

[54] DOOR MIRROR ANGLE CONTROL DEVICE FOR CAR

[75] Inventor: Mikio Kakinuma, Abikoshi, Japan
[73] Assignee: Niles Parts Co., Ltd., Tokyo, Japan
[21] Appl. No.: 760,919
[22] Filed: Jul. 31, 1985
[30] Foreign Application Priority Data Apr. 8, 1985 [JP] Japan .................. 60-051989[U]

[51] Int. Cl.⁴ .................. B60R 1/06; A47G 1/24
[52] U.S. Cl. .................. 248/479; 248/289.3
[58] Field of Search .......... 248/479, 900, 480, 487, 248/289.3, 477, 478; 350/631, 632, 636; 74/501 M

[56] References Cited

U.S. PATENT DOCUMENTS

| | | | |
|---|---|---|---|
| 1,810,435 | 6/1931 | Paulson | 248/479 X |
| 2,237,282 | 4/1941 | Reed | 248/487 |
| 4,213,675 | 7/1980 | Pilhall | 248/478 X |
| 4,306,701 | 12/1981 | Nierhaus et al. | 248/479 |
| 4,558,840 | 12/1985 | Manzoni | 248/900 X |

FOREIGN PATENT DOCUMENTS

| | | | |
|---|---|---|---|
| 0139509 | 5/1985 | European Pat. Off. | 350/632 |
| 3248759 | 7/1984 | Fed. Rep. of Germany | 350/632 |
| 2041857 | 9/1980 | United Kingdom | 248/900 |

*Primary Examiner*—Ramon S. Britts
*Assistant Examiner*—Karen J. Chotkowski
*Attorney, Agent, or Firm*—Ronald P. Kananen

[57] ABSTRACT

A car door mirror angle control device adjusts the mirror angle in accordance with the driver's seat position. A support mechanism supports the mirror case and adjusts the inclination of the mirror face in accordance with the driver's horizontal and vertical viewing angles. The driver's optimum viewing angle is attained by adjusting the mirror angles in horizontal and vertical planes when the position of the driver's seat is changed.

11 Claims, 6 Drawing Figures

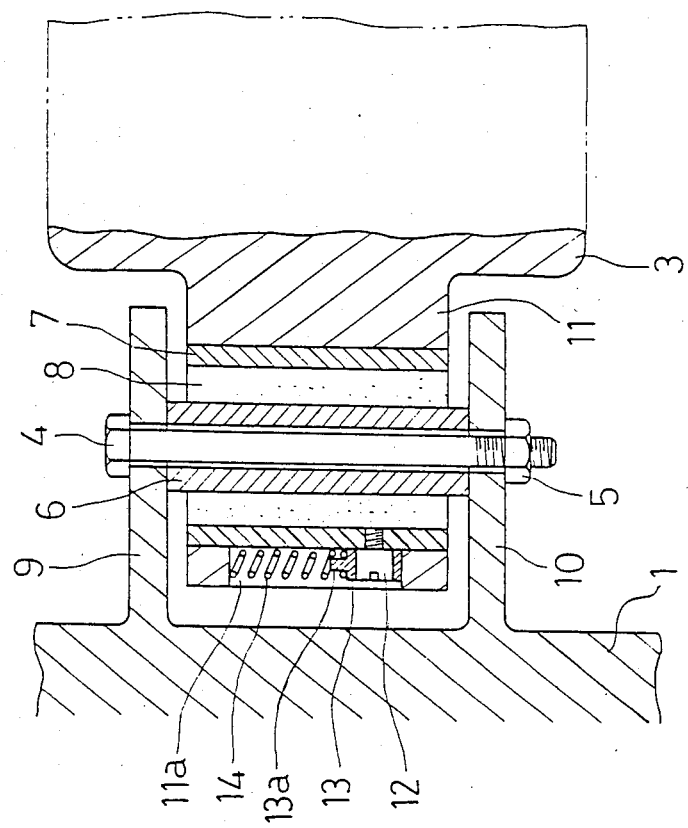
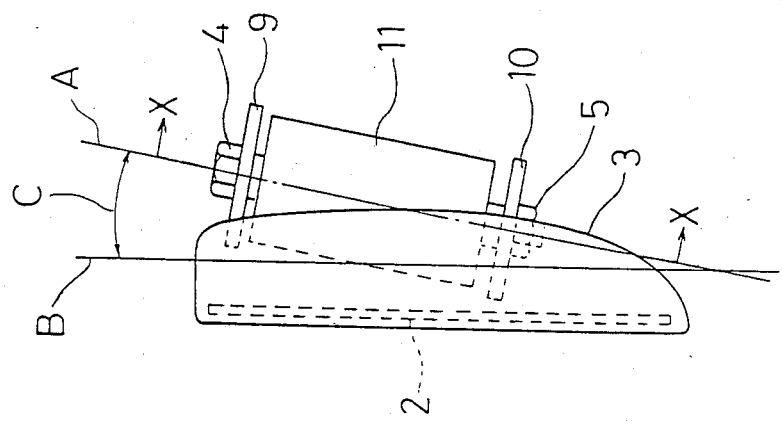

DOOR MIRROR ANGLE CONTROL DEVICE FOR CAR

BACKGROUND OF THE INVENTION

1. FIELD OF THE INVENTION

This invention concerns an improvement in a car door mirror in which the mirror can rotate in a vertical plane. This invention particularly relates to a technique which can easily control the viewing angle of the mirror in accordance with the driver's seat position.

2. DESCRIPTION OF THE PRIOR ART

Conventionally, in the kind of car door mirror wherein the door mirror case can only be opened and closed, the mirror itself must be rotated in both directions, horizontally and vertically, in order to get the optimum viewing angle for the driver.

In the conventional car door mirror, the mirror itself is rotated not only in the horizontal plane but also in the vertical plane for the best viewing angle for the driver, when the driver changes his seat position, but this adjustment is not easy.

SUMMARY OF THE INVENTION

In the existing car door mirror, when the driver moves his seat, the mirror itself should be readjusted vertically and horizontally in order to have an optimum viewing angle for the driver and this adjustment is difficult.

This invention is based on the above matters and developed to overcome these problems. In a car door mirror supported by a structure which enables the mirror case to rotate vertically, this invention relates to a support mechanism which supports the mirror case and controls the angle of the mirror to obtain the best vertical and horizontal viewing angle relative to the driver.

From the above construction of the device, when the driver's seat is moved backward and forward, the driver's optimum horizontal and vertical viewing angle can be set through only vertical adjustment of the mirror case of the door mirror.

BRIEF DESCRIPTION OF THE DRAWINGS

In the drawings, wherein FIG. 1 and FIG. 6 show the preferred embodiments of the car door mirror angle control device related with this invention:

FIG. 1 is a side view of a car door mirror related to this invention.

FIG. 2 is a cross sectional view taken along line A—A in FIG. 1.

FIG. 6 is a side view showing the state in controlling the door mirror angle change in accordance with the height of the view of the driver when the driver views the mirror.

DESCRIPTION OF THE PREFERRED EMBODIMENT

Figure 3:
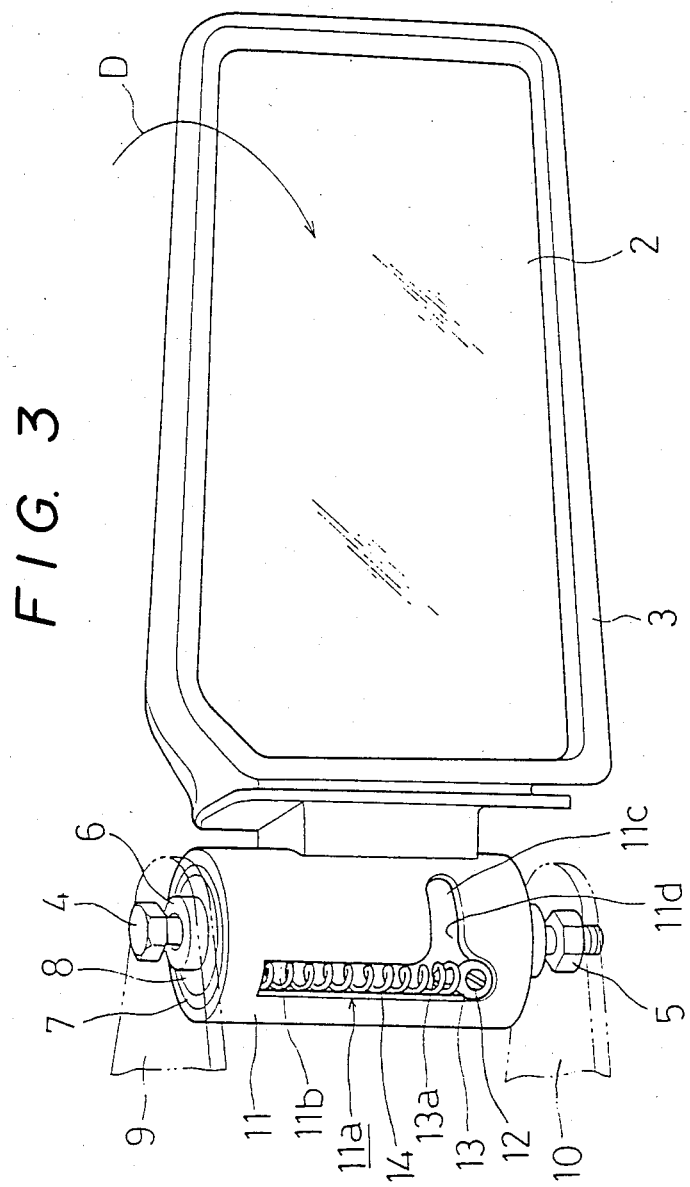
FIG. 3 is an oblique view of a door mirror angle control device according to the invention.

Referring to the attached drawings, a detailed explanation of a preferred embodiment is given as follows.

As shown in FIGS. 1-4, a mirror 2 is housed in a mirror case 3, and supported on a car door 1 between an upper flange 9, and a lower flange 10, both of which extend out from the door 1. A bolt 4 extends through the upper and lower flanges 9, 10 and is fastened with a nut 5. The bolt 4 thus has the function of a support axis. An inner cylinder 6 fits about the bolt 4 with free rotation. An outer cylinder 7 surrounds the inner cylinder 6. A shock absorber 8 composed of an elastic material, such as rubber, is located between the inner cylinder 6 and the outer cylinder 7 and is fixed to both cylinders. The cylinder 6 extends in the axial direction from the ends of the outer cylinder 7 and the shock absorber 8, and both ends which are in contact with the flanges 9 and 10 are subjected to an external press load due to the fastening of the bolt 4 and nut 5.

An arm 11 extends from the mirror case 3, and fits with the outer cylinder 7 with free rotation and free movement to the axial direction. A round bar-shaped pin 12 is fixed on the outer surface of the outer cylinder 7 by screwing and the like. In the arm 11, there is a groove 11a which consists of a vertical groove 11b and a horizontal groove 11c, as shown in FIG. 3. A ring 13 which fits with the pin 12 with free rotation has an extruded portion 13a for spring support. A coiled spring 14 presses the ring 13 downward along with the vertical groove 11b and are both located in the vertical groove 11b. The horizontal groove 11c joins with the lower portion of the vertical groove 11b and defines a cam portion 11d formed in the groove 11a in which the ring 13 moves between the vertical groove 11b and the horizontal groove 11c.

Figure 5:
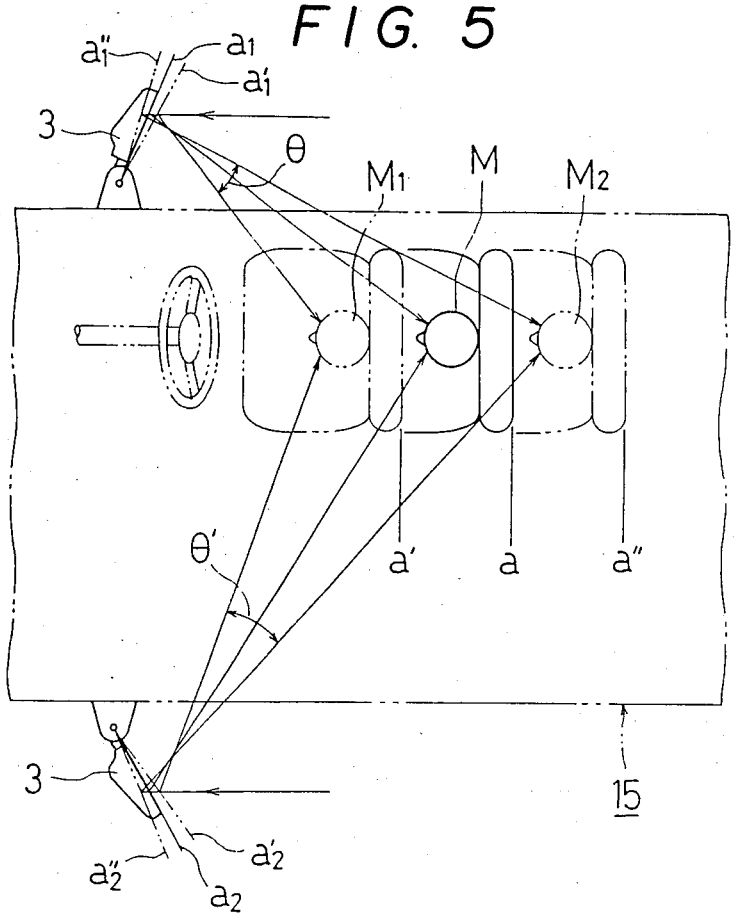
FIG. 5 is a plan view which illustrates the relationship between the view line of a driver and the door mirror angle when the driver views the mirror.

The relationships between the position of the mirror 2 and the eyes of a driver are as follows:

As shown in FIG. 5, in the car 15 with the steering wheel being positioned on the right side, when the driver M takes a seat at a base position a, the optimum position of a reflecting face of the mirror 2 are $a_1$ for the right side mirror and $a_2$ for the left side mirror respectively. When the driver is in the most forward seat position a', the optimum position of the faces of the mirrors are $a_1'$ for the right side mirror and $a_2'$ for the left side mirror respectively. When the driver takes the most rearward seat position a'', similarly, the optimum position of the mirror faces are $a_1''$ for the right side mirror and $a_2''$ for the left side mirror respectively.

Figure 6:
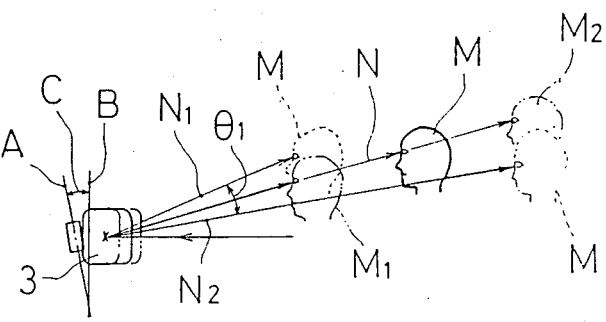

As shown in FIG. 6, among the drivers M who move the seat to the forward position a'' from the base position a, most drivers M1 are short in height. Among the drivers who need a rearward seat position a'', most drivers M2 are tall. Thus, the entire adjustment angle in the horizontal plane for optimum rearward viewing, which is determined with the position of the reflection faces of the mirror 2 and the position of the eyes of the driver M, are expressed by $\theta$ for the right mirror 3 and $\theta''$ for the left mirror 3 respectively as shown in FIG. 5. The entire adjustment angle in the vertical plane for optimum rearward viewing, as shown in FIG. 6, is given with $\theta 1$. In this case, each angle $\theta$, $\theta'$ and $\theta 1$ is expressed with the following relationship.

$$\theta 1 < \theta < \theta'$$

That is, the horizontal angle of vision from a driver to the right side mirror (for a right hand driven vehicle as in Japan or the United Kingdom) is greater than the vertical angle of vision, but less than the horizontal angle of view to the other mirror.

Therefore, if the view lines N1 and N2 move up and down from the base line N, the whole regulation angle $\theta 1$ is extremely small.

Therefore, by setting the door mirror 2, as shown in FIG. 1 and FIG. 6, so that the center line A of the support axis may be inclined with the required angle C (such as 10° to 20° toward the front of car) from the vertical line B, namely, by setting the inclination of the mirror face to correspond with the base viewline N, the optimum view angle in the vertical plane for the seat position changes is obtained at the same time within the whole adjustment angle $\theta 1$, through the adjustment by inclining the mirror case 3.

The operation of the above-described construction is given in the following description.

Figure 4:
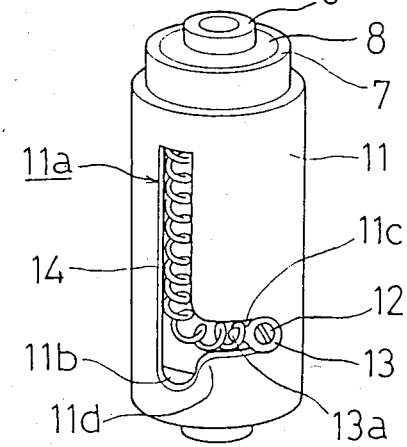
FIG. 4 is an oblique view of the arm equipped on the device shown in FIG. 1, and shows its state after the mirror case has been rotated.

The ring 13 fitted to the pin 12 is usually being pressed down toward the lower portion 11b of the vertical groove by the coiled spring 14. In this case, the weight of the mirror case 3 and its attachments (not shown), the vibration load of the car and the external impact force are applied on the coiled spring through the arm 11, the deflection of the coiled spring 14 is determined so that the ring 13 may not move to the horizontal groove through the cam portion 11d under these normal loads. By pressing the mirror case down with a force greater than the spring setting load, and by rotating the mirror case toward the direction D shown in FIG. 3 against the spring load, the ring 13 can be moved along the horizontal 11c through the cam portion 11d as shown in FIG. 4. In this way, the mirror case 3 can be set at any angle toward the door 1 side within the entire length of the groove 11c.

In the adjustment of the inclination of the mirror case 3 in the vertical plane in accordance with the seat position of the driver M, by setting the mirror 2 to the best viewing angle in the horizontal plane, the optimum angle of the mirror 2 in the vertical plane is also obtained.

According to this invention, when the driver's seat position is changed backward and forward, by only setting the mirror's vertical angle, the optimum viewing angle in the horizontal and vertical planes are obtained at the same time, which makes the mirror adjustment for best rearward viewing easy.

What is claimed is:

1. An angular positioning control device for a mirror comprising:

a cylinder means having a longitudinal cylinder axis, a supporting means for supporting said cylinder means so that said cylinder axis is positioned at the desired angle relative to the vertical, an arm disposed generally about said cylinder means, a mirror case secured to said arm for supporting the mirror and rotatable with said arm about said cylinder axis, said arm having a slot therethrough defining a cam guide path, and a cam follower secured to and positioned at least partially outside of said cylinder means and riding in said cam guide path when said mirror case is moved relative to said cylinder axis.

2. The device of claim 1 including, said cylinder means comprising an inner cylinder, an outer cylinder disposed about said inner cylinder, and a shock absorbing sleeve positioned between and connected to said inner and outer cylinders for absorbing shock when said mirror case is impacted.

3. The device of claim 2 including, said supporting means comprising a pair of spaced flanges, and said inner cylinder being pressed fit at its ends against said flanges.

4. The device of claim 3 including, said outer cylinder and said sleeve being shorter than said inner cylinder and having the ends thereof spaced from said flanges.

5. The device of claim 1 including, an elongated member passing through said cylinder means and defining said cylinder axis, and said cylinder means defining a sleeve having an inside diameter greater than the outside diameter of said member and spaced concentrically about said member.

6. The device of claim 1 including, a biasing means for biasing said cam follower against said cam guide path.

7. The device of claim 6 including, said biasing means being connected at one end to said cam follower and at another end connected to and rotatable with said arm about said cylinder axis.

8. The device of claim 7 including, said biasing means comprising a coil spring.

9. The device of claim 6 including, said biasing means biasing said cam follower generally downward.

10. The device of claim 9 including, said cam path including a generally horizontal portion and an upwardly sloping portion connected to said generally horizontal portion, and said biasing means requiring that a generally downward pressure be applied to said mirror case to cause said cam follower to travel up said upwardly sloping portion to said generally horizontal portion.

11. The device of claim 1 including, said cam follower comprising a round bar-shaped pin fixed to the outer surface of said cylinder means and a ring rotatably fitted on said pin, and said arm comprising a cylindrical housing positioned on the outer surface of said cylinder means.

* * * * *